United States Patent
Hu

(10) Patent No.: US 8,621,208 B1
(45) Date of Patent: Dec. 31, 2013

(54) SECURE KEY SERVER BASED FILE AND MULTIMEDIA MANAGEMENT SYSTEM

(75) Inventor: Guoan Hu, Andover, MA (US)

(73) Assignee: Guoan Hu, Andover, MA (US)

( * ) Notice: Subject to any disclaimer, the term of this patent is extended or adjusted under 35 U.S.C. 154(b) by 444 days.

(21) Appl. No.: 12/459,630

(22) Filed: Jul. 6, 2009

(51) Int. Cl.
*H04L 29/06* (2006.01)

(52) U.S. Cl.
USPC ............. 713/165; 713/171; 713/176; 705/51; 705/57; 726/30

(58) Field of Classification Search
USPC .................. 713/165–176; 705/51, 57; 726/30
See application file for complete search history.

(56) References Cited

U.S. PATENT DOCUMENTS

| | | | |
|---|---|---|---|
| 6,636,966 B1 * | 10/2003 | Lee et al. ........................ | 713/165 |
| 7,043,051 B2 * | 5/2006 | Kuzmich et al. ............... | 382/100 |
| 7,210,037 B2 * | 4/2007 | Samar ............................ | 713/176 |
| 7,240,366 B2 * | 7/2007 | Buch et al. ..................... | 726/14 |
| 7,346,580 B2 * | 3/2008 | Lisanke et al. .................. | 705/50 |
| 7,464,267 B2 * | 12/2008 | Zhu et al. ....................... | 713/168 |
| 8,180,708 B2 * | 5/2012 | Hurtado et al. ................. | 705/57 |
| 2002/0152393 A1 * | 10/2002 | Thoma et al. .................. | 713/189 |
| 2002/0178366 A1 * | 11/2002 | Ofir ................................ | 713/182 |
| 2003/0076819 A1 * | 4/2003 | Emerson, III .................. | 370/352 |
| 2003/0084306 A1 * | 5/2003 | Abburi et al. .................. | 713/188 |
| 2003/0190044 A1 * | 10/2003 | Higashi et al. ................. | 380/201 |
| 2004/0086124 A1 * | 5/2004 | Sasaki ............................ | 380/277 |
| 2004/0133914 A1 * | 7/2004 | Smith et al. ..................... | 725/86 |
| 2005/0010764 A1 * | 1/2005 | Collet et al. ................... | 713/165 |
| 2005/0060544 A1 * | 3/2005 | Huang et al. ................... | 713/165 |
| 2006/0193492 A1 * | 8/2006 | Kuzmich et al. ............... | 382/100 |
| 2007/0073728 A1 * | 3/2007 | Klein et al. ..................... | 707/10 |
| 2007/0106668 A1 * | 5/2007 | Maegawa et al. ................ | 707/9 |
| 2007/0116288 A1 * | 5/2007 | Rasizade et al. ............... | 380/258 |
| 2007/0223705 A1 * | 9/2007 | Kasahara et al. .............. | 380/281 |
| 2008/0002830 A1 * | 1/2008 | Cherkasov et al. ............ | 380/277 |
| 2008/0298580 A1 * | 12/2008 | Suu et al. ......................... | 380/42 |
| 2009/0316897 A1 * | 12/2009 | Kambayashi et al. ......... | 380/255 |
| 2010/0098253 A1 * | 4/2010 | Delerablee ..................... | 380/259 |

\* cited by examiner

*Primary Examiner* — Jeffrey Pwu
*Assistant Examiner* — Jayesh Jhaveri

(57) ABSTRACT

An embodiment of the present invention proposes a novel file and multimedia management and tracking system using a secure key server. The invention also proposes a novel, but very simple, digital watermarking technique. With the invented technology, the user's files/data can be encrypted and managed automatically, whether the data is stored in a USB format or in a public storage space. Furthermore, the file/data access record will be kept on the secure key server. Hence, an user can always track when the file/data was accessed. The advantage of the invented secure file manage system is that the key server never access the protected electronic data, and the data—encrypted or decrypted—are always on the local machine. The secure key server only manages the keys and records the key queryings. With the present invented technology, the multimedia server and the multimedia owner can protect their copyright, even when the multimedia is downloaded from the Internet. The key ideas of the invention are: (a) embedding the advanced secure key server proposed in a previous patent [2] into the multimedia server; (b) performing account management and key distribution automatically; (c) always pre-encrypting the electronic data; and (d) requiring that if anyone tries to get the decrypted electronic data, he/she must query the keys from the secure key server at least once when the software is started. This present invention also proposes a very simple digital watermarking system using reverse-verification technology.

1 Claim, 1 Drawing Sheet

Secure Communication Flow Based on a Secure Key Server

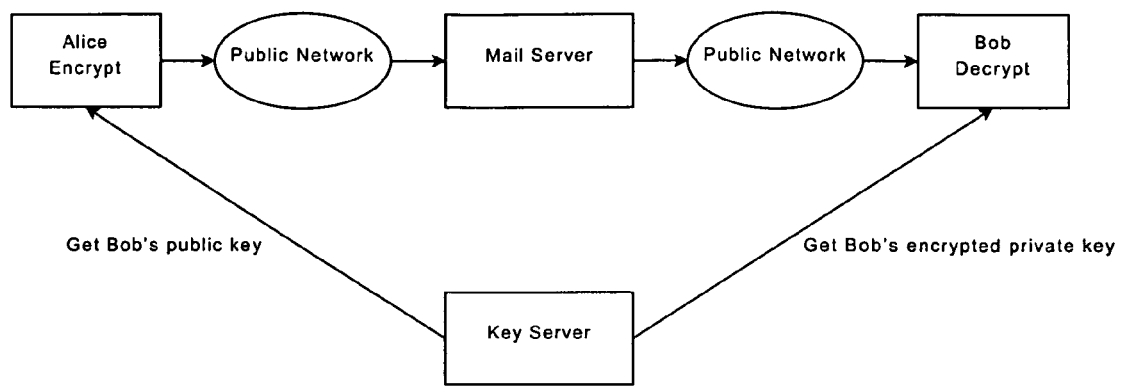
Secure Communication Flow Based on a Secure Key Server

SECURE KEY SERVER BASED FILE AND MULTIMEDIA MANAGEMENT SYSTEM

BACKGROUND

1. Key Words

Secure Key Server; Secure File Management; Secure Multimedia Management; Encryption/Decryption; Digital Watermarking 2. Field of Invention The present invention relates to techniques for a secure file and multimedia management system using secure key server technology. More specifically, the present invention relates to the technology of secure key server based secure file and multimedia registration system, tracking system, digital identification system, and license checking system.

3. Related Art

With the advancement of interne and electronic technology within the last 20 years, many online services and applications have emerged. While these services and applications provide convenience for users, their digital security and copyrights become a vital issue.

For example, nowadays, users can store data in their own files, in databases, in an USB, or even in a public storage server. But how can the users be sure that the files/data are never be accessed by unauthorized individuals? One of the solutions is to encrypt the files. There are many advanced encryption/decryption techniques to protect electronic data. However, most of these are not easy to use. The encryption/decryption technology is currently used only by some experts, and the average user would be extremely burdened in understanding how to utilize such technology.

One of the benefits the interne revolution is that it allows people to download multimedia from a web server, and play it locally on a electronic device, like a computer, iPod, Smart Phone, etc. However, this convenience brings about a major copyright issue. How can the multimedia server, or multimedia owner, be sure that the downloaded electronic data (multimedia) is not further duplicated and/or distributed? There are some technologies on the market to protect the illegal copying of multimedia, like AACS [1]. However, utilizing AACS requires the users to change their hardware. Even less convenient is the fact that whenever this AACS security is cracked (and it was cracked three years after its first version was published), there is no way to protect copyright unless the distributor asks the users to update their hardware again.

SUMMARY

An embodiment of the present invention proposes a novel file and multimedia management and tracking system using a secure key server. The invention also proposes a novel, but very simple, digital watermarking technique. With the invented technology, the user's files/data can be encrypted and managed automatically, whether the data is stored in a USB format or in a public storage space. Furthermore, the file/data access record will be kept on the secure key server. Hence, an user can always track when the file/data was accessed. The advantage of the invented secure file manage system is that the key server never access the protected electronic data, and the data—encrypted or decrypted—are always on the local machine. The secure key server only manages the keys and records the key queryings. With the present invented technology, the multimedia server and the multimedia owner can protect their copyright, even when the multimedia is downloaded from the Internet. The key ideas of the invention are: (a) embedding the advanced secure key server proposed in a previous patent [2] into the multimedia server; (b) performing account management and key distribution automatically; (c) always pre-encrypting the electronic data; and (d) requiring that if anyone tries to get the decrypted electronic data, he/she must query the keys from the secure key server at least once when the software is started. This present invention also proposes a very simple digital watermarking system using reverse-verification technology.

BRIEF DESCRIPTION OF THE FIGURES

FIG. 1 Secure Communication Flow Based on a Secure Key Server.

DETAILED DESCRIPTION

To better illustrate the generic principle behind this invention, we take examples of data file management and online music copyright protection. These specific implementations used as illustrations do not limit the scope of the possible applications of this invention.

If Alice has her electronic data stored in a USB medium (or at a public storage space, like a company's server), and the data is not encrypted (which it is not in most of the cases), anyone can copy or read her data. If the data is encrypted, every time Alice uses the data, she must decrypt the data with a password, and when the data is modified, she must re-encrypt the data with the password. Even with these lengthy hassles, she still does not know if her password has been disclosed, and if her data has already been decrypted by others.

For an online music download service, the music server can control the download on the first time, but the music server cannot control the downloaded music from being further duplicated and distributed. For example, after Alice downloads an online music in a legal way from a music server, she can make a private copy and send it to Bob. In such a situation, both the music server and the music owner are unable to take any effective action to prevent such a situation.

The secure key server based secure bit-stream transition flow is in shown FIG. 1, as described more in-depth in a previous patent [2]. This invention not only protects electronic data security, but also provides a way to fundamentally solve the file management and multimedia copyright issues indicated in previous two paragraphs.

Based on the technology invented by in a previous patent [2], the following newly invented file security management technologies could be implemented: Ecopy, Dcopy, Efile, Dfile, FileTracking, FileExchange, and FileDestory.

Ecopy:

the purpose of Ecopy is to protect the electronic data if the data is stored in a venue in which other people have access to. When a user, say, Bob, pushes the button Ecopy, the locally installed software tool and the secure key server will automatically perform the following procedures: (a) the local software will send the file name, Bob's account ID, and an encryption request to the secure key server; (b) the key server will generate a random AES key, record the file name and the AES key pair on Bob's account database, encrypt the AES key using Bob's public key, and send the encrypted AES key to Bob; (c) the local software will decrypt the AES key using Bob's private key, encrypt the electronic data using the AES key, and save the encrypted file in any location Bob wants.

Dcopy:

the purpose of Dcopy is to enable a user, say, Bob, to read his encrypted electronic data in an automated way. When Bob pushes the button Dcopy, the locally installed software tool and the secure key server will automatically perform the following procedures: (a) the local software will send the file name, Bob's account ID, and a decryption request to the secure key server; (b) the secure key server gets the AES key according to the file name, record the key request for this file name, encrypt the AES key using Bob's public key, and send the encrypted AES key to Bob; (c) the local software will decrypt the AES key using Bob's private key and decrypt the electronic data using the AES key.

Efile:

the purpose of Efile is the same as the purpose of Ecopy, with the only change of making the data into an encrypted-mode, so that the electronic data is secure when stored in a public server, or in a USB medium, which other people can access. If a user, say, Bob, tries to change the file, say, f.txt, to the encrypted mode, by pushing the Efile button, the locally installed software tool will perform the following procedures: (a) Ecopy the file to a temporary local file, which is encrypted; (b) copy the temporary local file into f.txt. (c) delete the temporary local file. With the above procedure, the file f.txt is full protected, and registered in the secure key server.

Dfile:

the purpose for Dfile is the same as the purpose of Dcopy, with the only change of making the data from encrypted mode to decrypted mode, so that the file can be readable. If a user, say, Bob, tries to change the file, say, f.txt, into the decrypted mode, by pushing the Dfile button, the locally installed software tool will perform the following procedures: (a) Dcopy the file to a temporary local file, which is decrypted; (b) copy the temporary local file into f.txt. (c) copy a garbage item into the temporary local file (to overwrite the decrypted data), and then delete the temporary local file. With the above procedure, the file f.txt is fully readable, but the secure key server will record that instance of data access and its access time for the file f.txt.

FileTracking:

the purpose of FileTracking is to enable the users to track their electronic data, and thus see when it was accessed. In many cases, a user, say, Bob, is not confident that his password has not already been disclosed; this means he's also not confident that his encrypted file, say, f.txt, in the public storage space, hasn't already been accessed by other people. With this invention, Bob can log into the secure key server and check the log file for f.txt, which was recorded when people query the AES key for accessing the file f.txt. Any time the file f.txt is decrypted, the time stamp will be recorded in the secure key server because the AES key is stored in the key servers, and is paired with the file name.

FileExchange:

the purpose of FileExchange is to enable a group of users to share the same encrypted file. For example, if Bob is the owner of an encrypted file and he wants to share the file with Alice, Alice can also decrypt the file Bob has stored in encrypted fashion; Bob just pushes the FileExchange button and adds Alice's user-name. The locally installed software tool and the key server will perform the following procedures: (a) send Alice's user-name, the file ID, and file exchange request to the key server; (b) the key server will copy the file name and its AES key pair from Bob's account into Alice's account; (c) Alice can now decrypt the same file too.

FileDestroy:

the purpose of FileDestroy is to enable users to destroy their electronic data from the public storage spaces, even if the user can no longer access the storage space. For example, if an employee, say, Bob, has been laid off, Bob can no longer access his file, say, f.txt, which is stored in his company's server. With this invention, Bob still can destroy the f.txt with the following procedures: (a) Bob logs into the key server from any public machine; (b) Bob finds the files he wants to destroy, say, f.txt; (c) Bob simply clicks "destroy"; (d) the key server will delete the AES key of the file f.txt. After the above procedure, no one—not even Bob—can decrypt f.txt because the decrypt key does not exist anymore.

Current music database servers cannot control the downloaded music from being further duplicated and/or distributed. This invention proposes a novel technology to embed the secure key server into music database server to manage the digital multimedia.

With the secure key server embedded into the music database server, we can dub the music database server "secure music server", which can manage the music database and store the music encrypt/decrypt keys. Each user's music piece (or a group of music pieces) has a unique ID and a unique symmetrical key. The secure music server also stores the individual user accounts' public key and encrypted private key.

The secure music management software will be the same as the normal music management or music playing software, with the secure feature is embedded. Such software is installed for each end user. For these users, the music license protection procedure is invisible.

When a user installs the secure music management software, the following procedures occur: (a) an user account is created; (b) there is a query for the user to input some basic information; (c) a pair of the public key and private key is generated; (d) the private key is encrypted by the user's password, and encrypted private key and the un-encrypted public key are sent to the secure music server. Storing the encrypted private key in the secure music server provides the flexibility for the user to re-install and use the secure music software at any physical location with the same user account.

When a user who has installed the secure music management software and has created an account downloads a music, piece from the secure music server (after paying the relevant fees), the server will automatically store the music piece's unique ID and the unique symmetrical key of this music piece into the user account database within the secure music server. Then the music is encrypted by this symmetrical key and the encrypted music (electronic data) will be sent to the user, but the music piece's ID and the music title will not be encrypted. The user will manage the music and store the music in their local database, with the installed the secure music management software.

When a user plays the music, which was downloaded from the secure music server, the secure music management software and the secure music server will automatically implement the following procedures: (a) the secure music management software will generate a random key, say, temporary key; (b) the secure music management software will encrypt the temporary key with the user's private key; (c) the secure music management software will call back the secure music server with the music ID and the encrypted temporary key; (d) the secure music server will check if the ID is in the user's account database (to check if the user has already paid the fee). If the ID is found in the user's account database, the music piece's unique symmetrical key will be queried according to ID; (e) the secure music server will decrypt the temporary key with the user's public key; (f) the secure music server will encrypt the symmetric key with the temporary key, then with the user's public key, and send the encrypted symmetry key to the user; (g) upon receiving the encrypted symmetric key, the secure music management software will decrypt the music symmetric key by the user's private key and the temporary key; and (h) the music data will be decrypted by the symmetric key.

The principle of the music license protection with the invented flow is that: (a) all music are encrypted, and it is not possible to play the music without the decryption key; (b) at the beginning of the each music piece's playing, the installed secure music management software must call back to the secure music server. (c) the symmetric key is double encrypted, and the temporary key is different each time the music piece plays.

If anyone fully duplicates a secure music management software (with an account) and a licensed piece of music, and tries to play the same music at more than one location, the secure music server will detect that the same music ID is queried more than once at the same time. In that case, it will only send the encrypted symmetry key for the first query, and will send a warning to the second query. One other hand, the same account is allowed to query the music piece which has already been paid for, even at the different locations (machines).

To reduce the interne connection time, one way is to not always call back to the secure music server, but perform only randomly call-backs.

Another solution to reduce the interne connection time is to only protect the secure music management software from being duplicated. Each time the secure music management software is started, it will call back the secure music server once. The music AES is encrypted with the user's public key, and is already sent to the user when the user downloads the music. The limitation of this technology is that each account can only play the music at one location.

The invention proposes a further license protection technology with the following procedure: When a user queries the symmetric key of the music, instead of sending the un-encrypted music ID, the secure music management software will send the encrypted ID to the secure music server, where the ID is encrypted by the user's private key. Therefore, this serves as a legal digital signature of the user. If the secure music server finds more than one query for the same music ID with the same user, or if the music ID is not in the user account database (which suggests the user did not pay), the secure music server will record the digital signature for possible further legal action.

Digital watermarking is the process of possibly irreversibly embedding information into a digital signal. Current watermarking is based on embedding the digital intellectual property with the multimedia ownership, copyright, or author's signature. Such methods have very limited legal power. For example, the hacker can say the digital intellectual property was bought from a flea market. In this invention, a reversed watermarking digital signature is proposed for further digital multimedia license protection. When a user is buying a music piece online, the secure music management software will send the user's signature, which is encrypted with the user's private key, to the secure music server. The secure music server will embedded this digital signature into this music piece as a watermark. If this music piece is spread illegally to the market, the music owner can find out who is the hack distributor, based on the digital signature watermark on the music piece. This technology is an efficient methodology to b protected from professional hackers and illegal distributors.

CONCLUSION

The data structures and code described in the foregoing description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Furthermore, the foregoing descriptions of embodiments of the present invention have been presented only for purposes of illustration and description. They are not intended to be exhaustive or to limit the present invention to the forms disclosed. Accordingly, many modifications and variations will be readily apparent. Additionally, the above disclosure is not intended to limit the present invention. The scope of the present invention is defined by the appended claims.

REFERENCES

[1] Advanced Access Content System (AACS), Introduction and Common Cryptographic Elements.
[2] Guoan Hu, Secure Bit-Stream Transition Flow and Its Application, U.S. patent application Ser. No. 12/317,617

What is claimed is:
1. An apparatus for protecting multi-media from piracy comprises:
a secure multi-media server which has an account for a user, managing a multi-media database and storing the user's public/private keys;
a unique ID, and a unique symmetric key for each multi-media, wherein the unique ID is used for searching the multi-media and the unique multi-media symmetric key for encrypting/decrypting the multi-media;
a random-generated key; and
a secure multi-media management software which is installed at the user side;
wherein, the secure multi-media management software generates the random-generated key; the secure multi-media management software encrypts the random-generated key with the user's private key; the secure multi-media management software calls back the secure multi-media server with the unique ID and the encrypted random-generated key; the secure multi-media server checks if the unique ID is in the user's account, and if the unique ID is found in the user's account, the unique multi-media symmetric key is queried according to the unique ID; the secure multi-media server decrypts the random-generated key with the user's public key; the secure multi-media server encrypts the unique multi-media symmetric key with the random-generated key, then encrypts the encrypted unique multi-media symmetric key with the user's public key, and sends the encrypted unique multi-media symmetric key to the secure multi-media management software at the user side; upon receiving the encrypted unique multi-media symmetric key, the secure multi-media management software decrypts the unique multi-media symmetric key by using the user's private key and the random-generated key; the multi-media is decrypted by the unique multi-media symmetric key.

\* \* \* \* \*